United States Patent
Hanano (10) Patent No.: US 8,869,175 B2
(45) Date of Patent: Oct. 21, 2014

(54) INFORMATION PROCESSING APPARATUS AND CONTROL METHOD THEREOF

(71) Applicant: Canon Kabushiki Kaisha, Tokyo (JP)

(72) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/676,584

(22) Filed: Nov. 14, 2012

(65) Prior Publication Data

US 2013/0074103 A1 Mar. 21, 2013

Related U.S. Application Data

(63) Continuation of application No. 13/093,639, filed on Apr. 25, 2011, now Pat. No. 8,336,060.

(30) Foreign Application Priority Data

Apr. 27, 2010 (JP) ................................. 2010-102525

(51) Int. Cl.
*G06F 13/00* (2006.01)
*H04N 1/00* (2006.01)

(52) U.S. Cl.
CPC .... *H04N 1/00241* (2013.01); *H04N 2201/0046* (2013.01); *H04N 2201/0049* (2013.01)
USPC .......................................... 719/321; 719/328

(58) Field of Classification Search
CPC ............................... G06F 9/4411; G06F 9/541
USPC .................................................. 719/321, 328
See application file for complete search history.

(56) References Cited

U.S. PATENT DOCUMENTS

| | | | | |
|---|---|---|---|---|
| 6,425,001 | B2 * | 7/2002 | Lo et al. ........................ | 709/217 |
| 2005/0270551 | A1 * | 12/2005 | Choi ............................. | 358/1.13 |
| 2007/0094673 | A1 * | 4/2007 | Hunt et al. .................... | 719/321 |
| 2010/0223340 | A1 * | 9/2010 | Pope et al. .................... | 709/206 |

* cited by examiner

*Primary Examiner* — Andy Ho
(74) *Attorney, Agent, or Firm* — Canon USA, Inc. IP Division (57) ABSTRACT

An apparatus having an OS to perform exclusive control among programs that are based on a predetermined API on a channel for communicating with a peripheral, a first driver for the peripheral to startup based on a request that is based on the predetermined API and communicate with the peripheral via the channel, a second driver for the peripheral to startup based on a request that is not based on the predetermined API and communicate with the peripheral via the channel, a program to communicate with the peripheral via the channel, and a controller to, when the second driver is started up based on a request that is not based on the predetermined API, if the program is using the channel, close the channel that the program is using based on exclusive control by the OS by starting the first driver.

17 Claims, 8 Drawing Sheets

INFORMATION PROCESSING APPARATUS AND CONTROL METHOD THEREOF

CROSS-REFERENCE TO RELATED APPLICATIONS

This application is a continuation of application Ser. No. 13/093,639 filed Apr. 25, 2011 that claims the benefit of Japanese Patent Application No. 2010-102525 filed Apr. 27, 2010, both of which are hereby incorporated by reference in their entirety.

BACKGROUND OF THE INVENTION

1. Field of the Invention

The present invention relates to an information processing apparatus for controlling a peripheral apparatus, and a control method thereof.

2. Description of the Related Art

Conventionally, an image reading apparatus (e.g., a dedicated scanner and a multifunction peripheral that includes a printer etc.) is one example of a peripheral apparatus. An image reading apparatus operating as such a peripheral apparatus reads an image based on an instruction from a scanner driver that is installed in an information processing apparatus, such as a computer.

Further, for such an image reading apparatus, a technology is known in which an operation unit provided in the image reading apparatus issues a read instruction to start image reading, and the read image is transferred to the information processing apparatus (see Japanese Patent Application Laid-Open No. 11-355481).

To detect on the information processing apparatus side the fact that a user has issued a read instruction from the operation unit of the image reading apparatus, a button monitoring program can be used to monitor a button event of an image input apparatus, such as the scanner, in the information processing apparatus. If the button monitoring program detects an event indicating that the button for instructing the image reading apparatus to start reading has been operated, image reading is executed in the following manner, and the information processing apparatus acquires the image data obtained by reading the image.

If the button monitoring program detects an event, first, a predetermined application is called up. This application is registered as an application to be started when the button is pressed. Then, the application calls up a scanner driver (e.g. a "tool without an interesting name" (TWAIN) driver) based on the TWAIN standard, and causes the image reading apparatus to read an image. Next, the application acquires the image data obtained by the reading performed by this TWAIN driver.

In this case, communication to detect an event and communication of image data are performed between the image reading apparatus and the information processing apparatus. However, depending on the operating system (OS) of the information processing apparatus, the system may lack a mechanism for simultaneously securing a communication channel for the button monitoring program and for the scanner driver.

Consequently, it is necessary to perform exclusive control of the communication channel between the button monitoring program and the scanner driver. More specifically, before the scanner driver is to acquire the image data, the OS closes the communication channel used by the button monitoring program, and then opens the communication channel for the scanner driver.

During this process, the OS refers to information (device information), which is recorded in a predetermined location, specifying the image reading apparatus associated with the button monitoring program, and device information associated with the scanner driver. If these pieces of information match, the OS then performs the above exclusive control. Further, in addition to the above-described startup method, in which the scanner driver is started via a button monitoring program, the user can also directly operate the scanner driver to execute image reading in the image reading apparatus.

However, for example, in some cases a scanner driver may be newly installed into an information processing apparatus in which a scanner driver and a button monitoring program are already present, and the image reading may be executed in the image reading apparatus by starting this new scanner driver. If image reading is executed in the image reading apparatus by starting this new scanner driver, the communication channel used by the already-running button monitoring program needs to be closed.

However, if the OS cannot specify the device information, for example if the new scanner driver is not based on a predetermined application programming interface (API) standard such as TWAIN, the OS cannot perform the above exclusive control. More specifically, even if a new scanner driver is started, if the device information is not recorded in a predetermined location, the OS cannot close the communication channel used by the already-running button monitoring program. Therefore, a scanner driver that has been started according to a procedure not based on a predetermined API cannot execute reading processing.

This problem not only occurs in image reading apparatuses, but in other peripheral apparatuses as well. Specifically, the same problem can occur in a situation which requires exclusive control of the communication channel used among a plurality of programs when there is no mechanism for closing a communication channel that is being used by another program based on the startup of the device driver.

SUMMARY OF THE INVENTION

The present invention is directed to an information processing apparatus, and a control method thereof, capable of suitably closing a communication channel that is being used by another program even when that channel cannot be closed just by starting a device driver.

According to an aspect of the present invention, an information processing apparatus having an operating system (OS) configured to perform non-exclusive control among a plurality of programs that are based on a predetermined application program interface (API) on a communication channel for communicating with a peripheral apparatus, the information processing apparatus including a first device driver for the peripheral apparatus, configured to startup based on a request that is based on the predetermined API and communicate with the peripheral apparatus via the communication channel, a second device driver for the peripheral apparatus, configured to startup based on a request that is not based on the predetermined API and communicate with the peripheral apparatus via the communication channel, a communication program configured to communicate with the peripheral apparatus via the communication channel, and a control unit configured to, when the second device driver is issued with a startup instruction based on a request that is not based on the predetermined API, if the communication program is using the communication channel, close the communication channel that the communication program is using based on non-exclusive control by the OS by starting the first device driver, to enable the second device driver to use the communication channel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Not all of the constituent elements of the apparatus used in the present exemplary embodiment are essential to the present invention. Further, various modifications and applications of these constituent elements are possible. More specifically, the present invention is not limited to the specific configuration described in the following exemplary embodiments.

Figure 1:
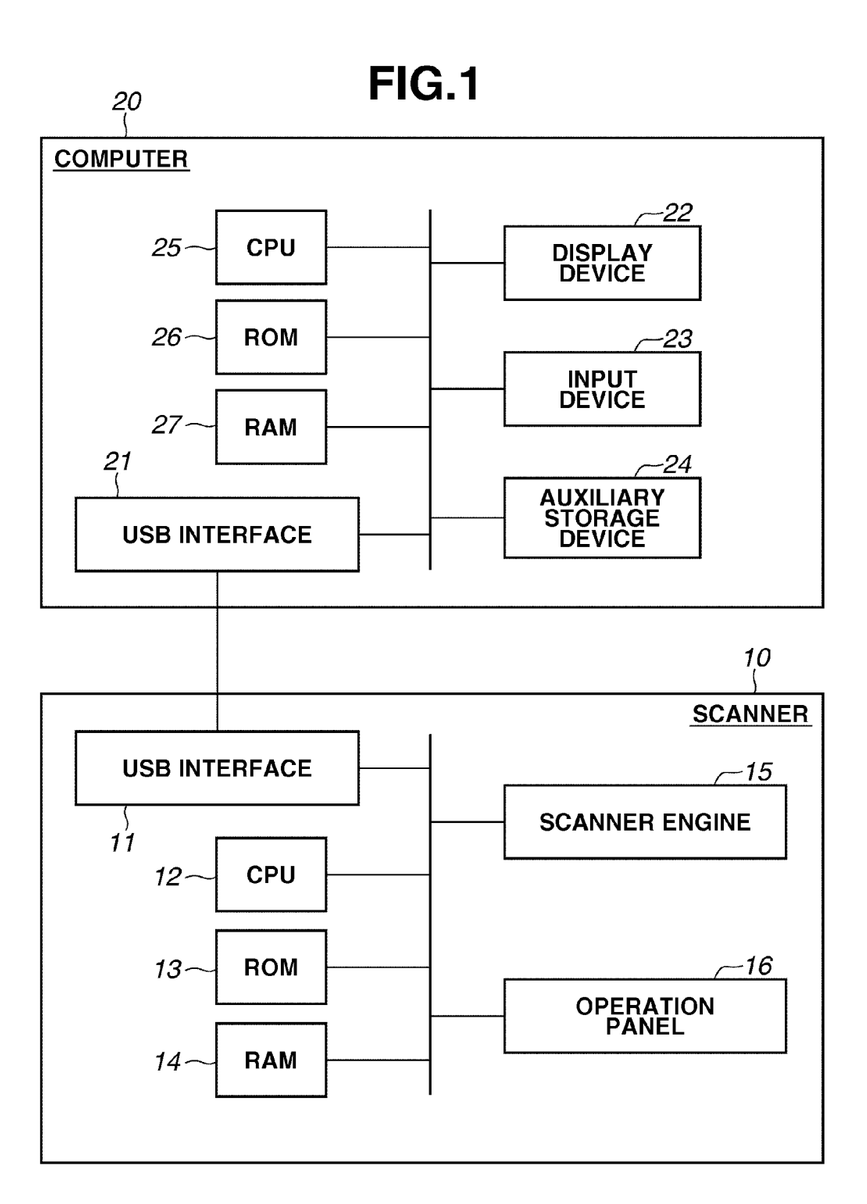
FIG. 1 is a block diagram illustrating an image reading system according to an exemplary embodiment.

FIG. 1 is a block diagram illustrating the configuration of an image reading system that includes a computer 20, which is an example of the information processing apparatus according to a first exemplary embodiment of the present invention, and a scanner 10, which is an example of a peripheral apparatus.

The scanner 10 includes, as hardware resources, a universal serial bus (USB) interface 11, a central processing unit (CPU) 12, a read-only memory (ROM) 13, a random access memory (RAM) 14, a scanner engine 15, and an operation panel 16. The USB interface 11 transmits and receives data to and from the computer 20 based on a USB standard.

The CPU 12 loads into the RAM 14 a scanner 10 control program that is stored in the ROM 13, and controls the operation of the scanner 10 by executing that control program. In addition to the control program, the ROM 13 stores the parameters that are required for operation of the scanner 10. The RAM 14 is used as a CPU 12 work area, and also as a temporary storage area for state information about the scanner 10 and image data.

The scanner engine 15 includes a light source which irradiates light onto a document, and a charge-coupled device (CCD) color image sensor for reading reflected light and photoelectrically converting the read light. The scanner engine 15 reads an image of the document by scanning the document, which is placed on a platen of the scanner 10, and produces image data based on the read image. The operation panel 16 includes a display unit that displays a state of the scanner 10 and a menu that allows the user to perform operations, and hard keys that allow the user to perform various operations including the instruction to start reading. The operation panel 16 may have some other configuration, such as a touch panel.

Further, although the scanner 10 is used here as an example of a dedicated scanner, the scanner 10 may be configured as a multifunctional device that also includes other additional functions, such as a printer. In addition, when reading the document image, although the document is placed on the platen and then scanned, a document conveyance mechanism may be provided, so that scanning is performed by fixing the scanner engine 15 and conveying the document.

Moreover, as the operation for starting the reading performed by the scanner 10, instead of using the operation panel 16, when the reading target document is detected to have been set in the scanner 10, that fact may be notified to the computer 20.

Still further, the scanner 10 may be configured without the CPU 12, so that the scanner engine 15 is operated based on a control from the computer 20. In addition, instead of a color scanner, a monochrome scanner or a film scanner that reads film may be employed.

The computer 20 includes, as hardware resources, a USB interface 21, a display device 22, an input device 23, an auxiliary storage device 24, a CPU 25, a ROM 26, and a RAM 27. As the computer 20, a general-purpose personal computer may be employed.

The USB interface 21 transmits and receives data to and from a peripheral apparatus based on a USB standard. The display device 22 displays various information, such as various user interfaces (UI), for operating the scanner 10 based on software installed in the computer 20.

The input device 23 is realized by a keyboard, a pointing device and the like, and is for inputting information indicating an operation from the user. The auxiliary storage device 24 is realized by an internal or an external hard disk, for example, and stores various information relating to operation of the scanner 10, such as the scanner 10 control program.

The CPU 25 loads into the RAM 27 various programs stored in the auxiliary storage device 24 and the ROM 26, and controls the operations of the computer 20 by executing those programs. The ROM 26 stores various programs and various pieces of information for operating the computer 20. The RAM 27 is used as a CPU 25 work area, and also stores various information.

Figure 2:
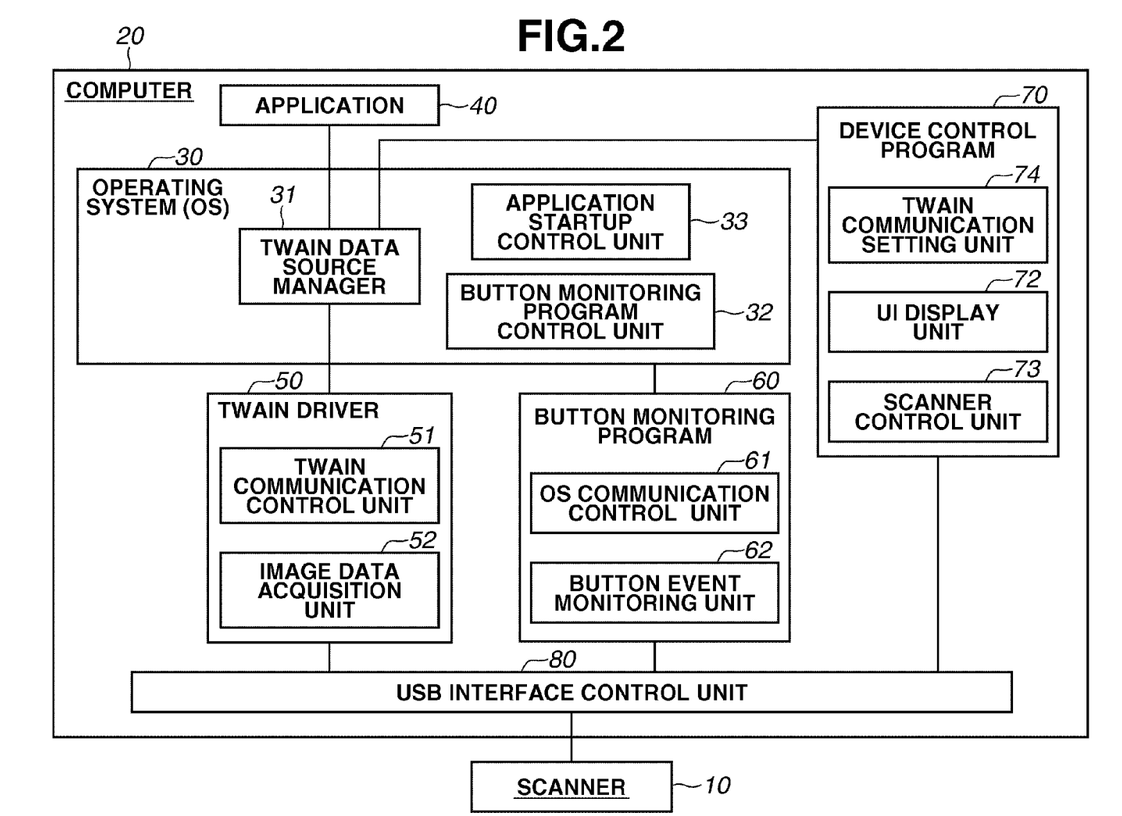
FIG. 2 is a block diagram illustrating a software configuration of a computer 20.

Next, referring to FIG. 2, the configuration of the functions that are realized by the software in the computer 20 illustrated in FIG. 1 will be described. The respective functions illustrated in FIG. 2 are realized by, for example, the CPU 25 reading and executing the programs stored (installed) in the ROM 26 and the auxiliary storage device 24 while using the RAM 27 as a work area.

The functions of the computer 20 can be broadly separated into an OS 30, an application 40, a TWAIN driver 50, a button monitoring program 60, a device control program 70, and a USB interface control unit 80.

The OS 30 includes functions such as control of the basic units for operation of the computer 20, control of output to the display device 22 and input from the input device 23, and management of the various memories, such as the auxiliary storage device 24. Further, the OS 30 includes a TWAIN data source manager (TWAIN DSM) 31, a button monitoring program control unit 32, and an application startup control unit 33.

The TWAIN DSM 31 controls the application 40 and the TWAIN driver 50. The TWAIN DSM 31 is an API that realizes communication between the application 40 and the TWAIN driver 50 based on a TWAIN standard. If an instruction is issued to startup the TWAIN driver 50, the TWAIN DSM 31 issues a close request to the button monitoring program 60.

When a monitoring program for monitoring whether a peripheral apparatus such as the scanner 10 has been operated is present in the computer 20, the button monitoring program control unit 32 starts up and shuts down that monitoring program. The application startup control unit 33 is realized by an API that provides a function for starting a specified application.

The application 40 is a software program for processing input image data. The application 40 can acquire image data from a data source (scanner driver) by issuing an instruction to that data source based on the TWAIN standard via the TWAIN DSM 31.

The application 40 can also edit or correct the acquired image data, display the resultant data on the display device 22, and store the data as an image file in the auxiliary storage device 24. Further examples of the application 40 include character recognition software, which recognizes character information included in input image data, and converts the recognized character information into a character code.

The TWAIN driver 50 is a driver that performs controls such as the transmission of a command for controlling the scanner 10 and the reception of image data from the scanner 10. The transmission of a command and the reception of image data by the TWAIN driver 50 are performed via the USB interface control unit 80.

Although the TWAIN driver 50 is associated with device information for specifying the image reading apparatus, in the present exemplary embodiment, the TWAIN driver 50 is associated with device information indicating the scanner 10. This device information indicating the scanner 10 is recorded in a predetermined file associated with the TWAIN driver 50. Further, the TWAIN driver 50 includes a TWAIN communication control unit 51 and an image data acquisition unit 52.

The TWAIN communication control unit 51 exchanges a command group based on the TWAIN standard of the application 40 with the TWAIN driver 50. The TWAIN communication control unit 51 receives a reading setting from the application 40, such as a reading resolution, a color mode, and a document size, and sets the received reading setting in the TWAIN driver 50.

Further, in response to an image transfer request from the application 40, the TWAIN communication control unit 51 performs control so that the image data read by the scanner 10 is transferred to the application 40. The transfer of the reading setting information and the image data is performed via the TWAIN DSM 31. The image data acquisition unit 52 acquires the image data read by the scanner 10 via the USB interface control unit 80.

The image data acquired by the image data acquisition unit 52 is stored in the RAM 27, and then transferred to the application 40 based on a control by the TWAIN communication control unit 51. In addition to startup based on an instruction from a TWAIN-compatible application, the TWAIN driver 50 can also be started based on a direct operation from the user, and even when a read instruction is made by the user, issue a read instruction.

The button monitoring program 60 transmits a command for controlling the scanner 10 and receives data indicating the state of the scanner 10. This transmission of a command and reception of data indicating a state is performed via the USB interface control unit 80.

Further, although the button monitoring program is associated with device information for specifying a peripheral apparatus, in the present exemplary embodiment, the button monitoring program will be associated with device information indicating the scanner 10. This device information indicating the scanner 10 is recorded in a predetermined file associated with the button monitoring program 60. The state of the scanner 10 at this stage is not limited to whether a "button" is pressed or not. This state may be in any form, as long as the fact that some kind of operation is performed by the user can be acquired.

Further, in the present exemplary embodiment, a plurality of button monitoring programs 60 may simultaneously be present in the computer 20 (the auxiliary storage device 24). However, the OS 30 in the present exemplary embodiment only starts up one of the button monitoring programs as a button monitoring program for monitoring the state of the scanner 10 connected via the USB interface 21.

The present exemplary embodiment will be described below with only an arbitrary one button monitoring program 60 being started. The button monitoring program 60 has an OS communication control unit 61 and a button event monitoring unit 62.

If the OS 30 detects that the scanner 10 is connected via the USB interface 21, the OS communication control unit 61 opens a USB port according to a procedure based on a predetermined communication standard (plug & play). The term "USB port" refers to a logical channel for communication via the USB interface 21.

By opening the USB port, a transfer pipe for exchanging information with the scanner 10 connected via the USB interface 21 is secured. Further, the USB port for communicating with the scanner 10 is used exclusively by one scanner driver or one button monitoring program.

When the connection with the scanner 10 starts, first, the button monitoring program uses the USB port to monitor for a button event from the scanner 10. If there is a plurality of button monitoring programs, one of these is selected and started based on a predetermined condition.

Further, if the connection via the USB interface 21 is disconnected, and if the TWAIN driver 50 has been started, the OS communication control unit 61 closes the USB port according to a procedure based on a predetermined communication standard.

The button event monitoring unit 62 periodically monitors whether a button event has occurred due to a user operation on the operation panel 16 of the scanner 10. Although this operation performed by the user of the monitoring target will be described using the pressing of a "button" as an example, as described above, the present invention is not limited to the pressing of a "button". Any operation may be employed, as long as the operation is performed by the user for the purpose of reading the document.

When a button event such as an instruction from the operation panel 16 to start reading is detected, the button event monitoring unit 62 instructs a predetermined application to startup via the application startup control unit 33 of the OS 30. For example, the image data can be acquired in a desired format from the TWAIN driver 50 in conjunction with detection of the button event by transferring a prepared file relating to the reading setting of the scanner 10 to the started-up application.

The device control program 70 has a function as a scanner driver for performing controls, such as transmission of commands which control the scanner 10 and reception of image data from the scanner 10, and a function as an application for processing input image data based on a user instruction.

Further, the device control program 70 can also perform processing (e.g., acquisition of read image data as RAW data) not based on the TWAIN standard, which cannot be performed by the TWAIN driver 50. The device control program 70 can be selectively utilized by the user as a program that enables the image data to be subjected to different processing from that of the TWAIN driver 50.

When an instruction is issued to startup the TWAIN driver 50, the OS 30 closes the button monitoring program 60 that is associated with the same device information as the device information associated with the TWAIN driver 50. The OS 30 refers to device information recorded in the predetermined file associated with the above programs, and executes exclusive control of the USB port.

However, even if an instruction is issued to startup the device control program 70, the OS 30 cannot close the currently running button monitoring program 60 based only on that. This is because the device control program 70 does not record device information in the predetermined file like that described above.

Further, the device control program 70 has a TWAIN communication setting unit 71, a UI display unit 72, and a scanner control unit 73.

The TWAIN communication control unit 71 exchanges a command group based on the TWAIN standard with the TWAIN driver 50 via the TWAIN DSM 31. To perform exclusive control of the USB port for the scanner 10, the TWAIN communication setting unit 71 performs a vender customization setting in the TWAIN driver 50 in order to release the USB port for a predetermined duration.

The UI display unit 72 provides display information for displaying on the display device 22 a UI screen which allows a user to perform a reading setting and a setting for editing image data. The UI display unit 72 also provides a screen for performing a version upgrade of the device control program 70 and the scanner 10 firmware.

The scanner control unit 73 transmits commands for controlling the scanner 10 and receives image data from the scanner 10 via the USB interface control unit 80. The device control program 70 may be started based on either an instruction from the button monitoring program or an instruction from the user via the UI screen provided by the UI display unit 72.

Figure 3:
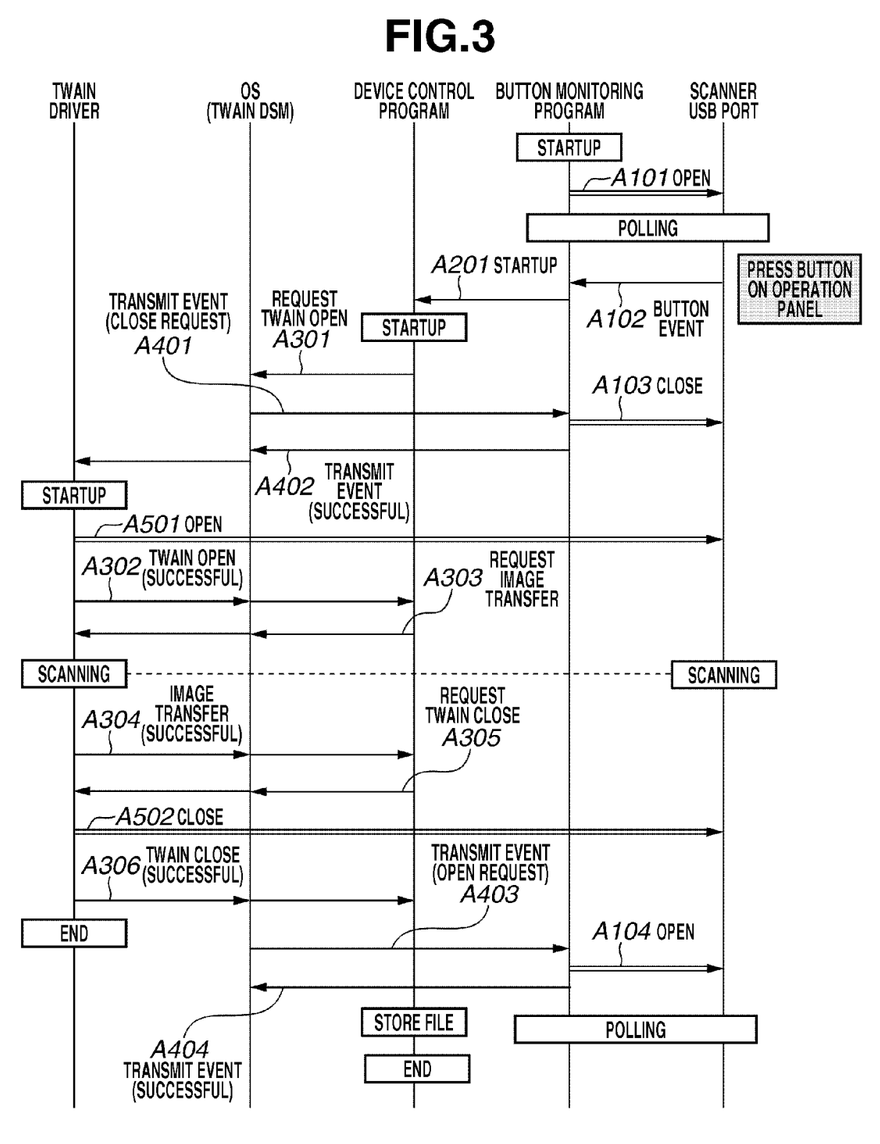
FIG. 3 illustrates a sequence of reading processing that uses a button monitoring program 60.

Next, a typical processing flow performed when an operation for instructing the scanner 10 to start reading is performed, and based on this the application 40 acquires image data via the TWAIN driver 50 will be described. FIG. 3 illustrates a sequence flow of the processing performed by the computer 20 in this case.

The following sequence illustrates a processing flow performed by the CPU 25 of the computer 20 loading programs stored in the ROM 26 and the auxiliary storage device 24 into the RAM 27, and executing those programs. This processing is an example of a case in which the OS 30 performs exclusive control of a USB port (a data transfer pipe with the scanner 10) during processing for reading an image based on a TWAIN standard by recognizing the startup and shut down of the scanner driver.

First, when the scanner 10 is connected to the computer 20 via the USB interface 21, one button monitoring program 60 is started by the OS 30. Next, in step A101, the button monitoring program 60 opens a USB port, which is a logical channel for communication with the scanner 10, and repeatedly performs polling to monitor the occurrence of a button event in the scanner 10.

When an operation (button pressing) for issuing a read instruction is performed by the user from the operation panel 16 of the scanner 10, the button monitoring program 60 detects a signal indicating the occurrence of a button event via the opened USB port.

The data transfer during the exchange with the scanner 10 in steps A201 to A202 is performed based on interrupt transfer. At this stage, the button monitoring program 60 occupies the USB port.

When the button monitoring program 60 detects a button event in step A102, in step A201, the button monitoring program 60 starts a predetermined application. The application started in this step is preregistered in the OS 30. If there is only one registered application, that application is started.

If two or more applications are registered, a screen prompting the user to make a selection among those plurality of registered applications is displayed by the OS 30 on the display device 22, and the application specified by the user from among the displayed applications is started. In this example, the application 40 is started.

In step A301, the application 40 started based on an instruction from the button monitoring program 60 issues an open request command based on the TWAIN standard to the TWAIN driver 50, and instructs the TWAIN driver 50 to startup. This open request command is not transmitted directly to the TWAIN driver 50 from the application 40 but is transmitted via the TWAIN DSM 31 of the OS 30.

When the TWAIN DSM 31 receives the TWAIN driver open request command transmitted in step A301, in step A401, before starting the TWAIN driver 50, the TWAIN DSM 31 transmits a close request event to the button monitoring program 60 that is already running.

In step A103, the button monitoring program 60, which has received this close request event, closes the already open USB port that is occupied. In this example, since the device information associated with the TWAIN driver 50 and the device information associated with the button monitoring program match, exclusive control is performed by the OS 30.

More specifically, the TWAIN DSM 31 of the OS 30 refers to the above predetermined files associated with the TWAIN driver 50 and the TWAIN driver 50, determines that the same device information is recorded in both files, and based on that determination, performs exclusive control of the USB port.

If the USB port is successfully closed in step A103, in step A402, the button monitoring program 60 transmits information indicating a successful close as a response to the event transmitted in step A401. When the TWAIN DSM 31 confirms the response from step A402, the TWAIN DSM 31 starts up the TWAIN driver 50.

In step A501, the TWAIN driver 50 opens the USB port (bulk transfer pipe) for performing communication with the scanner 10 during the startup processing. Consequently, the USB port is in the possession of the TWAIN driver 50. When the USB port is successfully opened, in step A302, the TWAIN driver 50 transmits to the TWAIN DSM 31 information indicating a successful open as a response to the open request transmitted in step A301. The TWAIN DSM 31 receives this response, and in step A302, notifies the application 40 of the successful open.

In step A303, the application 40, which has received the notification that the USB port has been successfully opened, issues an image transfer request command based on the TWAIN standard, and this command is transmitted to the TWAIN driver 50 via the TWAIN DSM 31. Then, the TWAIN driver 50, which has received this command, makes the scanner 10 read a document image based on a reading setting specified from the application 40, and acquires the resultant read image data.

In step A304, the TWAIN driver 50 optionally performs processing such as correction on the acquired image data (read image data), and transfers the resultant data to the application 40. The transfer of the image data between the TWAIN driver 50 and the scanner 10 is performed based on bulk transfer.

In step A305, when the application 40 has finished receiving the read image data from the TWAIN driver 50, the application 40 issues a close request command based on the TWAIN standard to the TWAIN driver 50. This command is transmitted to the TWAIN driver 50 via the TWAIN DSM 31. When the TWAIN driver 50 receives this command, it performs shut down processing.

In step A502, the TWAIN driver 50 closes the already opened USB port that it possesses. Then, if the USB port is successfully closed in step A502, the TWAIN driver 50 transmits information indicating a successful close to the TWAIN DSM 31 as a response to the close request transmitted in step A305.

In step A306, the TWAIN DSM 31, which has received this response, notifies the application 40 of the successful close. Once the TWAIN driver 50 transmits the information indicating the successful close transmitted in step A305, the TWAIN driver 50 is ended.

The TWAIN DSM 31 of the OS 30, which has received information indicating the TWAIN driver 50 has successfully closed the USB port, makes the button monitoring program 60 open the USB port in order to monitor the occurrence of a new read request event by the scanner 10. More specifically, in step A403, the TWAIN DSM 31 transmits an open request event to the button monitoring program 60, and in step A104, the button monitoring program 60, which has received this request, opens the USB port.

Then, in step A404, when the USB port is successfully opened by the button monitoring program 60, the button monitoring program 60 transmits information indicating that the USB port has been successfully opened as a response to the transmission of the open request event. When the button monitoring program 60 has opened the USB port and occupied the USB port, the button monitoring program 60 restarts the polling, which monitors for events in the scanner 10, and performs the same processing as the above-described processing that is performed at startup.

The application 40, which has received the read image data from the TWAIN driver 50, performs, for example, processing for storing this image data in the auxiliary storage device 24 as an image file based on an instruction from the user, and then the application 40 is ended.

This processing executed by the application 40 may also be performed before the TWAIN driver 50 is ended. Further, this image data processing is not limited to the file storage. Other types of processing may also be performed. In addition, the processing contents may be pre-specified, or may be the one specified based on an instruction from the user after the read image data was received.

Moreover, in the above processing, although interrupt transfer is used for the button event communication and bulk transfer is used for the read image data communication, bulk transfer may be used for either communication. Even in such a case, the communication channel is controlled in an exclusive manner between the scanner driver and the button monitoring program. This also applies in the following description.

Thus, when the TWAIN driver 50 is used to make the scanner 10 perform reading processing, the TWAIN DSM 31 of the OS 30 can control the USB port in an exclusive manner between the TWAIN driver 50 and the button monitoring program 60 that are associated with the same device information.

Therefore, exclusive control can be similarly performed not only when the TWAIN driver 50 detects a button event in the scanner 10, but even when the TWAIN driver 50 is directly started by the user, and when the TWAIN driver 50 is started based on a command based on the TWAIN standard from the application 40.

Figure 4:
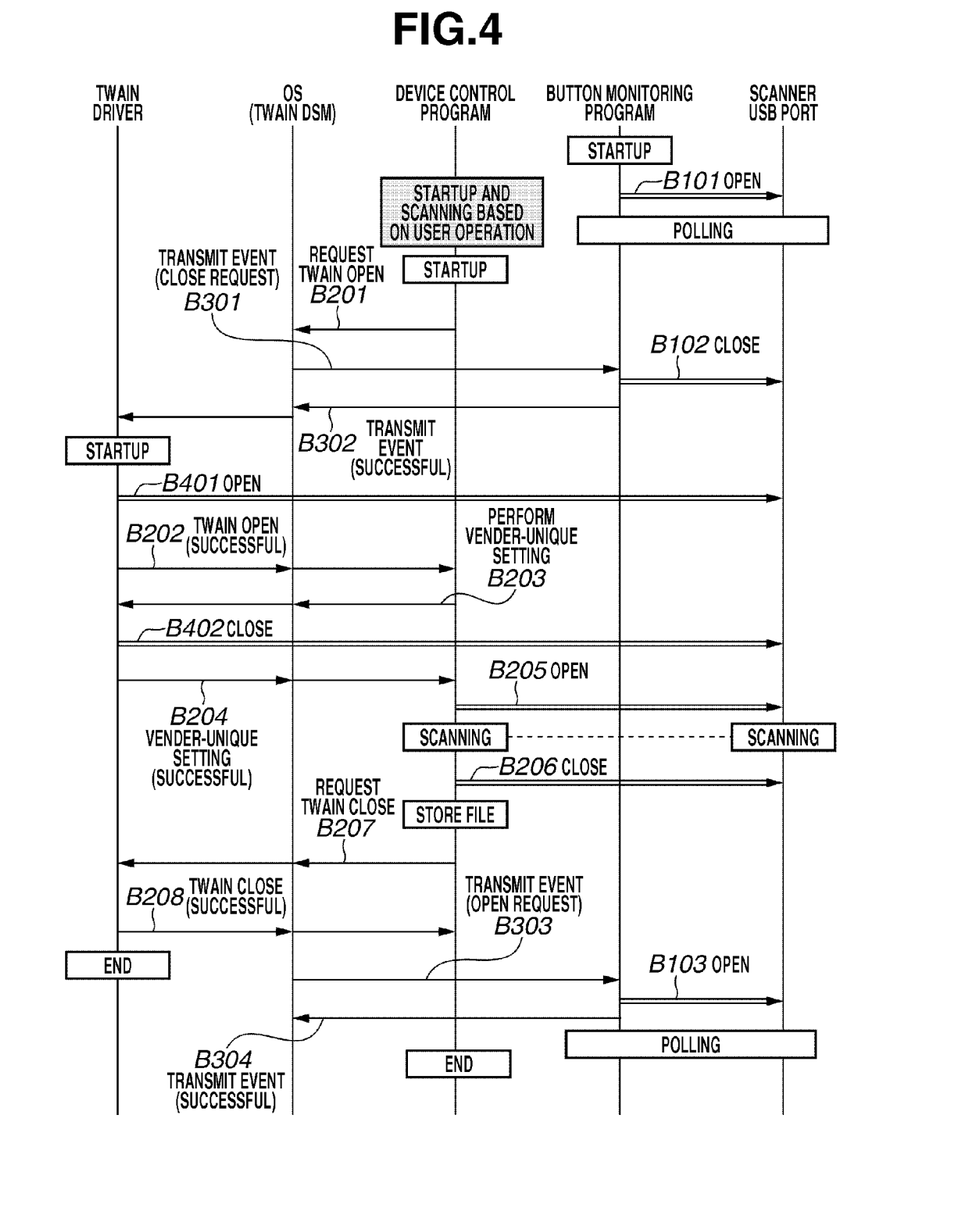
FIG. 4 illustrates a sequence of reading processing that uses a device control program 70.

Next, the processing flow when the device control program 70 is used to make the scanner 10 perform reading processing will be described. Here, the device control program 70 makes the scanner 10 execute reading processing without using a command based on the TWAIN-standard.

FIG. 4 illustrates a sequence flow of the processing according to the first exemplary embodiment performed by the computer 20 in this case. The following sequence illustrates a processing flow performed by the CPU 25 of the computer 20 loading programs stored in the ROM 26 and the auxiliary storage device 24 into the RAM 27, and executing those programs.

First, when the scanner 10 is connected with the computer 20 via the USB interface 21, one button monitoring program is started by the OS 30. Next, in step B101, the button monitoring program 60 opens a USB port, which is a logical channel for communication with the scanner 10, and repeatedly performs polling to monitor the occurrence of a button event in the scanner 10. The processing is the same as that illustrated in FIG. 3.

Figure 5:
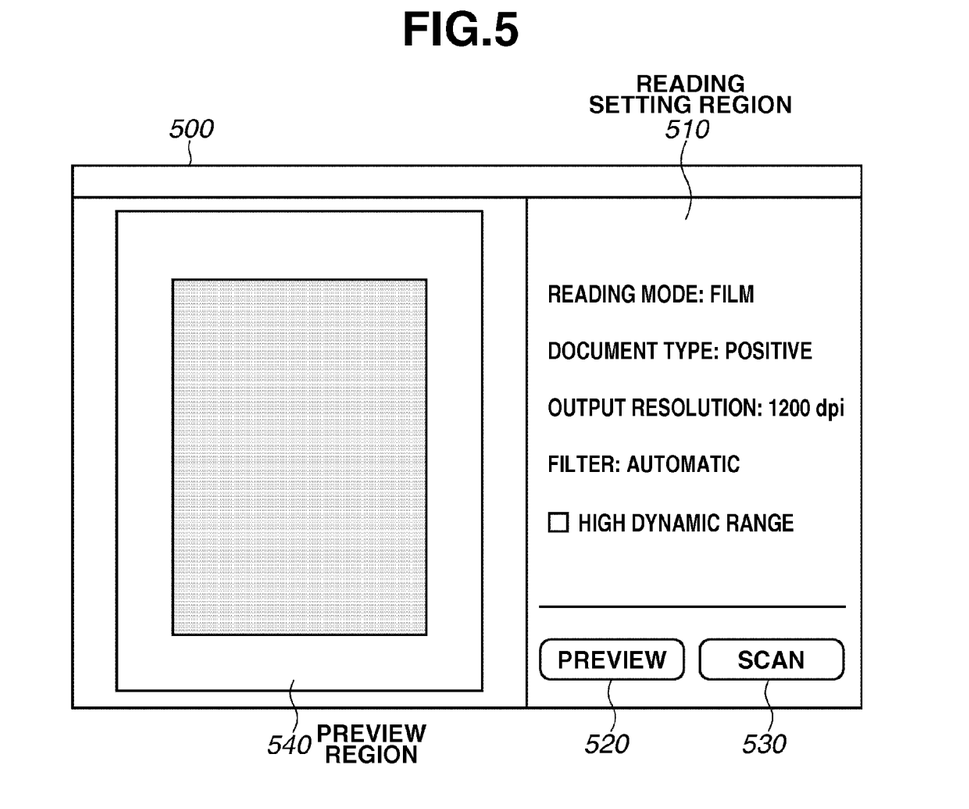
FIG. 5 illustrates an example of a UI screen of the device control program 70.

When the device control program 70 is started based on an instruction from the user, a screen like that illustrated in FIG. 5 provided by the UI display unit 72 is displayed on the display device 22. In FIG. 5, a main dialog box 500 is a main screen that displays read image data and receives a reading setting from the user.

A read setting region 510 is a region in which the user performs a reading setting. Examples of reading settings include a reading mode, a document type, an output resolution, a filter, and high dynamic range. Examples of the reading mode include paper/photograph and film document.

The type of document that can be selected depends on the specified reading mode. For paper/photograph, examples include a color document, a monochrome document, a color photograph, a monochrome photograph, a color document/photograph, and a monochrome document/photograph. For film, examples include a color film (positive), a color film (negative), a monochrome film (positive), and a monochrome film (negative).

The output resolution can be selected from any of 75, 150, 300, 600, and 1,200 dpi. The filter can be selected from automatic, no filter, strong sharpness, and weak sharpness. If the high dynamic range box is checked, the difference between the brightest portion and the darkest portion of the acquired data (the dynamic range) is widened.

A "preview" button 520 makes the scanner 10 read an image at a low resolution regardless of the output resolution setting of the read setting region 510, and display the result in a preview region 540. The user can specify a desired region within the image displayed in the preview region.

A "scan" button 530 makes the scanner 10 read an image based on the settings specified by the read setting region 510 (main scanning) to acquire read image data. If a region is specified after a preview, only the image data for the specified region is acquired. Further, if the pre-specified processing performed during the main scanning is only the acquisition of image data, an image of the main scanning result is displayed in the preview region 540.

If the "scan" button 530 is specified by the user, the read image data is converted into an image file, which is given a predetermined name and stored in the auxiliary storage device 24.

In addition, during the period that the button monitoring program 60 secures the USB port, the device control program 70 is started and the scan button 530 is specified. More specifically, the device control program 70 issues a startup instruction based on a request that is not based on the TWAIN standard.

Since the reading processing is not performed using the TWAIN driver 50, exclusive control of the USB port by the OS 30 (TWAIN DSM 31) is not performed just based on the starting up of the device control program 70. This is because the device control program 70 can directly control the scanner 10, so that, here, device information is not recorded in the predetermined file that enables exclusive control by the OS 30.

Thus, here, despite the fact that reading processing is not performed using the TWAIN driver 50, the TWAIN driver 50 is started in order to close the USB port being used by the button monitoring program 60. More specifically, in step B201, when a reading instruction is issued by the device control program 70 based on the user specifying the scan button 530, an open request command for the TWAIN driver 50 is issued to the TWAIN DSM 31.

In step B301, the TWAIN DSM 31, which has received this open request command, transmits a close request event to the button monitoring program 60 that is associated with the same device information as the TWAIN driver 50 device information. Here, device information indicating the scanner 10 is recorded in the predetermined files for both the TWAIN driver 50 and the button monitoring program 60.

In step B102, the button monitoring program 60, which has received this close request event, closes the already opened USB port that is being used thereby. Then, when the USB port is successfully closed, in step B302, the button monitoring program 60 transmits information indicating a successful close as a response to the close request transmitted in step B301. When the TWAIN DSM 31 confirms that the USB port has been successfully closed, the TWAIN DSM 31 starts up the TWAIN driver 50 based on the open request transmitted in step B201.

In step B401, the TWAIN driver 50 opens the USB port for performing communication with the scanner 10 during the startup processing. When the USB port is successfully opened, the TWAIN driver 50 notifies the TWAIN DSM 31 of that fact. Then, the TWAIN DSM 31, which has received this notification, notifies the device control program 70 that the USB port has been successfully opened by the TWAIN driver 50.

When the device control program 70 confirms that the TWAIN driver 50 has started and that the USB port has been successfully opened, in step B203, the device control program 70 issues a command instructing the setting of a vender-unique customization setting.

This command is a command based on the TWAIN standard, and is notified to the TWAIN driver 50 via the TWAIN DSM 31. The vender-unique setting that is notified is for requesting the closure of the temporarily opened USB port.

Here, the reading processing is not performed by the TWAIN driver 50, but rather is performed by starting the TWAIN driver 50, and closing the USB port being used by another program by utilizing the exclusive control function of the OS 30.

Further, for the reading processing to use the device control program 70, the USB port needs to be closed by the TWAIN driver 50. Therefore, the vender-unique setting is employed. However, if the USB port can be closed by the TWAIN driver 50, it is not limited to the vender-unique setting. Some other method may also be employed.

By closing the open request used by the button monitoring program 60 and the TWAIN driver 50 as described above, the device control program 70 can use the USB port.

In step B402, the TWAIN driver 50, which has received the command transmitted in step B203 from the device control program 70, closes the already opened USB port that is being used thereby. Then, when the USB port is successfully closed, in step B204, the TWAIN driver 50 transmits information indicating a successful close as a response to the command transmitted in step B203.

During the period that the device control program 70 is performing the reading processing, to prevent the OS 30 from trying to startup the button monitoring program 60, the TWAIN driver 50 itself is not closed at this stage.

In step B205, when the device control program 70 confirms that the USB port has been closed, the device control program 70 opens the USB port. Then, the device control program 70 makes the scanner 10 execute image reading based on the reading setting set in the read setting region 510 and acquires the resultant read image data. When the acquisition of the read image data from the scanner 10 is finished, in step B206, the device control program 70 closes the USB port.

Based on a specification by the user, the device control program 70 performs processing such as storing the image data in the auxiliary storage device 24 as an image file. The processing for producing and storing the image file may also be performed before closing the USB port.

In step B207, when the reading processing (in this example, acquisition of the read image data and file storage) is finished, the device control program 70 issues a close request command based on the TWAIN standard to the TWAIN driver 50. This command is transmitted to the TWAIN driver 50 via the TWAIN DSM 31. When the TWAIN driver 50 receives this command, in step B208, it performs end processing, and transmits information indicating a successful close as a response to the close request transmitted in step B207.

In step B303, the TWAIN DSM 31, which has confirmed that the TWAIN driver 50 is closed, transmits an open request event to the button monitoring program 60. Then, in step B103, upon receiving the open request event, the button monitoring program 60 opens the USB port.

Then, in step B304, when the USB port is successfully opened by the button monitoring program 60, the button monitoring program 60 transmits information indicating that the USB port was successfully opened as a response to the transmission of the open request event. When the button monitoring program 60 has opened the USB port and occupied the USB port, the button monitoring program 60 restarts the polling which monitors events in the scanner 10, and performs the same processing as the above-described processing that is performed at startup.

Based on the processing illustrated in FIG. 4, just by simply starting up and issuing a read instruction, the OS can be made to perform exclusive control even when a scanner driver that does not perform exclusive control of a communication channel is used to make the TWAIN DSM of the OS perform reading processing. More specifically, when the scanner driver performs reading processing, starting the TWAIN driver enables a communication channel used by another program to be closed by using the exclusive control function of the OS.

The scanner driver can close the communication channel if the exclusive control of the OS is used, even if the scanner driver cannot identify the program that is using the communication channel. This is because the exclusive control function of the OS closes the communication channel being used by another program associated with the same device information when a program that will use the communication channel is started.

Therefore, for example, even if there is a plurality of button monitoring programs in the computer 20, and the device control program cannot identify which of the button monitoring programs is currently using the communication channel, the button monitoring program using the communication channel can be closed.

Next, a second exemplary embodiment of the processing performed when the device control program 70 is used to make the scanner 10 perform reading processing will be described. In this case too, the device control program 70 makes the scanner 10 execute reading processing without using a command based on the TWAIN-standard. Further, the fact that the OS performs exclusive control among a plurality of programs (scanner drivers and button monitoring programs) on a USB port, which is a logical channel, is the same as the first exemplary embodiment.

Figure 6:
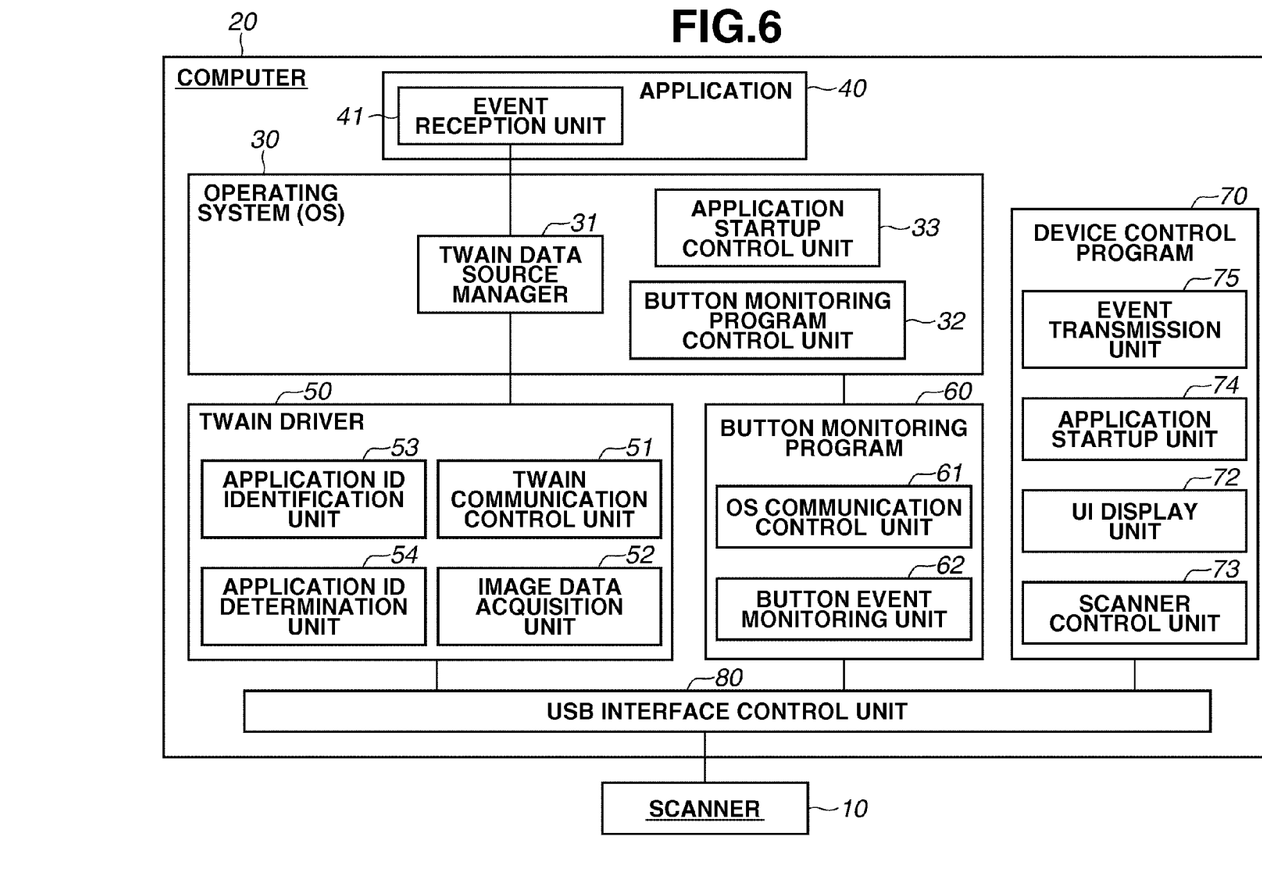
FIG. 6 is a block diagram illustrating a software configuration of the computer 20.

FIG. 6 illustrates a configuration of functions which are realized based on software by the computer 20 for performing the processing of this second exemplary embodiment. These functions are denoted using the same reference numerals as in FIG. 2. Functions that are not specifically described below function in the same manner as described using FIG. 2.

Similar to the configuration in FIG. 2, the application 40 can instruct the TWAIN driver 50, which is a data source based on the TWAIN standard, to open and close via the TWAIN DSM 31. However, the application 40 according to the second exemplary embodiment is, as is described below, only for assisting exclusive control of the USB port in order to perform communication with the scanner 10.

Therefore, the application 40 according to the second exemplary embodiment does not necessarily have to have a UI screen. Further, when started, the application 40 can be operated in the background. However, the application 40 does not have to be only for assisting the exclusive control of the USB port. The application 40 may combine this function with another function.

The application 40 has an event reception unit 41. This event reception unit 41 is realized by an interprocess communication API provided by the OS 30. The event reception unit 41 performs different processing based on the type of event that is received.

Similar to the configuration in FIG. 2, the TWAIN driver 50 transmits commands for controlling the scanner 10 and receives image data based on the TWAIN standard. In addition to the configuration illustrated in FIG. 2, the TWAIN driver 50 according to the second exemplary embodiment has an application ID identification unit 53 and an application ID determination unit 54.

The application ID identification unit 53 identifies the application that has instructed the TWAIN driver 50 to startup. An application that is based on the TWAIN standard possesses a unique ID, which can be identified by the application ID identification unit 53.

The application ID determination unit 54 determines whether the application corresponding to the ID identified by the application ID identification unit 53 is a predetermined application. The application ID determination unit 54 performs this determination based on whether the ID identified by the application ID identification unit 53 matches the ID of a specific application stored in the auxiliary storage device 24.

Similar to the configuration in FIG. 2, the device control program 70 is a program having a function as a scanner driver and a function as an application, and can perform processing that is not based on the TWAIN standard. In addition to the configuration illustrated in FIG. 2, the device control program 70 according to the second exemplary embodiment has an application startup unit 74 and an event transmission unit 75.

The application startup unit 74 instructs a predetermined application to startup using the API provided by the OS 30. The event transmission unit 75 transmits information indicating a predetermined event based on the interprocess communication API provided by the OS 30.

Next, a sequence flow of the processing performed according to the second exemplary embodiment by the computer 20 including the configuration illustrated in FIG. 6 will be described referring to FIG. 7. The following sequence illustrates a processing flow performed by the CPU 25 of the computer 20 loading programs stored in the ROM 26 and the auxiliary storage device 24 into the RAM 27, and executing those programs.

First, the operations that, in step C101, in a state in which the button monitoring program 60 is started and the USB port is open, the device control program 70 is started and a reading instruction is made from the UI screen of FIG. 5 are the same as those of the first exemplary embodiment illustrated in FIG. 4.

In step C201, when a reading instruction is issued by the device control program 70, a startup instruction is issued to the application 40. In step C202, when the application 40 is started, the device control program 70 transmits an open request event to the application 40 by the event transmission unit 75.

In step C301, when the event reception unit 41 receives the open request event transmitted in step C202, the application 40 issues an open request command based on the TWAIN standard, and instructs the TWAIN driver 50 to startup.

In step C401, when the TWAIN DSM 31 of the OS 30 receives the open request transmitted in step C301, before the TWAIN driver 50 is started, the TWAIN DSM 31 transmits a close request command to the button monitoring program 60. Then, in step C102, the button monitoring program 60, which has received the close request event transmitted in step C401, closes the already opened USB port that is being used thereby.

Then, when the USB port is successfully closed, in step C402, the button monitoring program 60 transmits information indicating a successful close as a response to the close request transmitted in step C401. Closing the USB port that is being used by the button monitoring program 60 enables the device control program 70 to use the USB port.

When the TWAIN DSM 31 confirms that the USB port has been successfully closed, the TWAIN DSM 31 starts up the TWAIN driver 50 based on the open request transmitted in step C301.

During the startup processing, the TWAIN driver 50 identifies the ID of the application that made the startup instruction using the application ID identification unit 53, and determines whether this ID matches a predetermined ID using the application ID determination unit 54. Further, since this is a startup instruction from the application 40, it is determined that the identified ID matches the predetermined ID, and thus the TWAIN driver 50 does not open the USB port. Consequently, the processing efficiency can be increased by omitting the processing for opening and closing the USB port by the TWAIN driver 50, which in this example does not perform reading processing. This processing will be described in more detail below.

Then, in step C302, the TWAIN driver 50 transmits information indicating a successful open to the application 40 via the TWAIN DSM 31 as a response to the open request transmitted in step C301.

In step C203, the application 40, which has received the information indicating a successful open from the TWAIN driver 50, transmits an event indicating that fact to the device control program 70. In step C204, when the device control program 70 has received the event transmitted in step C203, the USB port is opened.

In step C205, the device control program 70 makes the scanner 10 execute reading based on the reading setting set in the read setting region 510, and acquires the resultant read image data. When the acquisition of the read image data from the scanner 10 is finished, in step BC205, the device control program 70 closes the USB port. Then, based on a specification by the user, the device control program 70 performs processing such as storing the image data in the auxiliary storage device 24 as an image file. The processing for producing and storing the image file may also be performed before closing the USB port.

In step C206, when the reading processing (in this example, acquisition of the read image data and file storage) is finished, the device control program 70 transmits a close request event to the application 40. In step C303, when the event reception unit 41 of the application 40 has received this close request event, the application 40 issues a close request command based on the TWAIN standard.

This command is transmitted to the TWAIN driver 50 via the TWAIN DSM 31. When the TWAIN driver 50 has received this command, in step C304, it performs end processing, and transmits information indicating a successful close as a response to the close request transmitted in step C303. Then, the application 40, which has received this information, transmits an event indicating a successful close to the device control program 70.

The device control program 70, which has received this event, ends itself. The reason why the TWAIN driver 50 is not ended while the device control program 70 is performing the reading processing is to prevent the OS 30 from trying to startup the button monitoring program 60 while the device control program 70 is performing the reading processing.

In step C403, the TWAIN DSM 31, which has received the information indicating a successful close transmitted in step C304, transmits an open request to the button monitoring program 60. In step C103, the button monitoring program 60, which has received this request, opens the USB port. Then, in step C404, when the USB port is successfully opened by the button monitoring program 60, the button monitoring program 60 transmits information indicating that the USB port has been successfully opened as a response to the transmission of the open request event.

When the button monitoring program 60 has opened the USB port and occupied the USB port, the button monitoring program 60 restarts the polling which monitors for events in the scanner 10, and performs the same processing as the above-described processing that is performed at startup.

Figure 8:
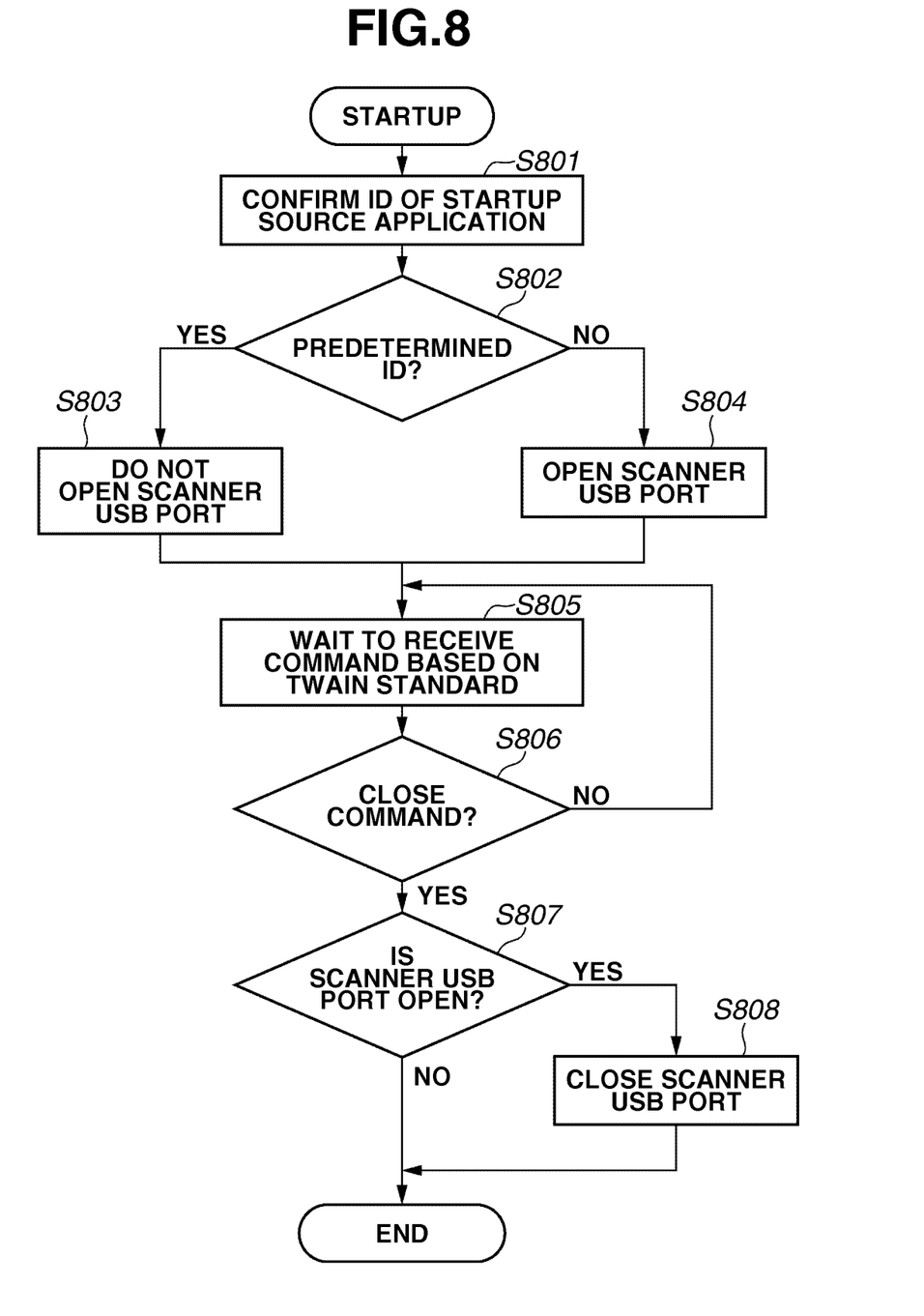
FIG. 8 is a flowchart illustrating a part of processing performed by a TWAIN driver.

A part of the processing performed when the TWAIN driver 50 has received the TWAIN open request will now be described. FIG. 8 is a flowchart illustrating the flow of the processing performed in this case. This flowchart illustrates a processing flow performed by the CPU 25 of the computer 20 loading programs stored in the ROM 26 and the auxiliary storage device 24 into the RAM 27, and executing those programs.

The processing performed in this flowchart is started when the TWAIN driver 50 receives an open request command based on the TWAIN standard. In step S801, the application ID identification unit 53 identifies the ID of the application that has transmitted the received open request command.

Then, in step S802, the application ID determination unit 54 determines whether the ID identified in step S801 is a predetermined ID. This "predetermined ID" refers to the ID of an application that assists exclusive control of the USB port. In the present exemplary embodiment, this refers to the ID of the application 40.

Further, this predetermined ID is pre-stored in a predetermined region of the auxiliary storage device 24. The TWAIN driver 50 can refer to the predetermined ID when it performs the processing of this flowchart. This predetermined ID is not limited to one ID. A plurality of IDs may exist. Here, the TWAIN driver 50 determines the transmission source of the instruction to start it up.

If it is determined in step S802 that the identified ID is the predetermined ID (YES in step S802), the processing proceeds to step S803. If it is determined in step S802 that the identified ID is not the predetermined ID (NO in step S802), the processing proceeds to step S804. Proceeding to step S803 corresponds to a case in which the command from step C301 is received in the sequence in FIG. 7.

In step S803, the TWAIN driver 50 determines that the USB port that enables itself to communicate with the scanner 10 is not open. This is because, as described above, the TWAIN driver 50 is started so that the application 40 in FIG. 6 closes the USB port that is currently being used by using the exclusive control function of the OS 30 to prevent the TWAIN driver 50 from performing reading processing. Consequently, the processing for opening and closing the USB port by the TWAIN driver 50 becomes unnecessary, so that the processing efficiency can be increased.

In step S804, the TWAIN driver 50 opens the USB port for communication with the scanner 10. This is, when the application based on the TWAIN standard makes the scanner 10 execute image reading using the TWAIN driver 50, and acquires the read image data, to enable thereof. This step is executed based on processing like that illustrated in step A501 and subsequent steps illustrated in FIG. 3. Thus, a description will be omitted here.

Next, in step S805, the TWAIN driver 50 waits for the reception of a command based on the TWAIN standard. In step S806, if it is determined that a close request command based on the TWAIN standard is received (YES in step S806), the processing proceeds to step S807.

In step S807, the TWAIN driver 50 determines whether the USB port is open. If it is determined that the USB port is open (YES in step S807), the processing proceeds to step S808. In step S808, the TWAIN driver 50 closes the USB port that is open, and then shuts itself down. If it is determined that the USB port is not open (NO in step S807), the TWAIN driver 50 is ended without performing the processing for closing the USB port.

Figure 7:
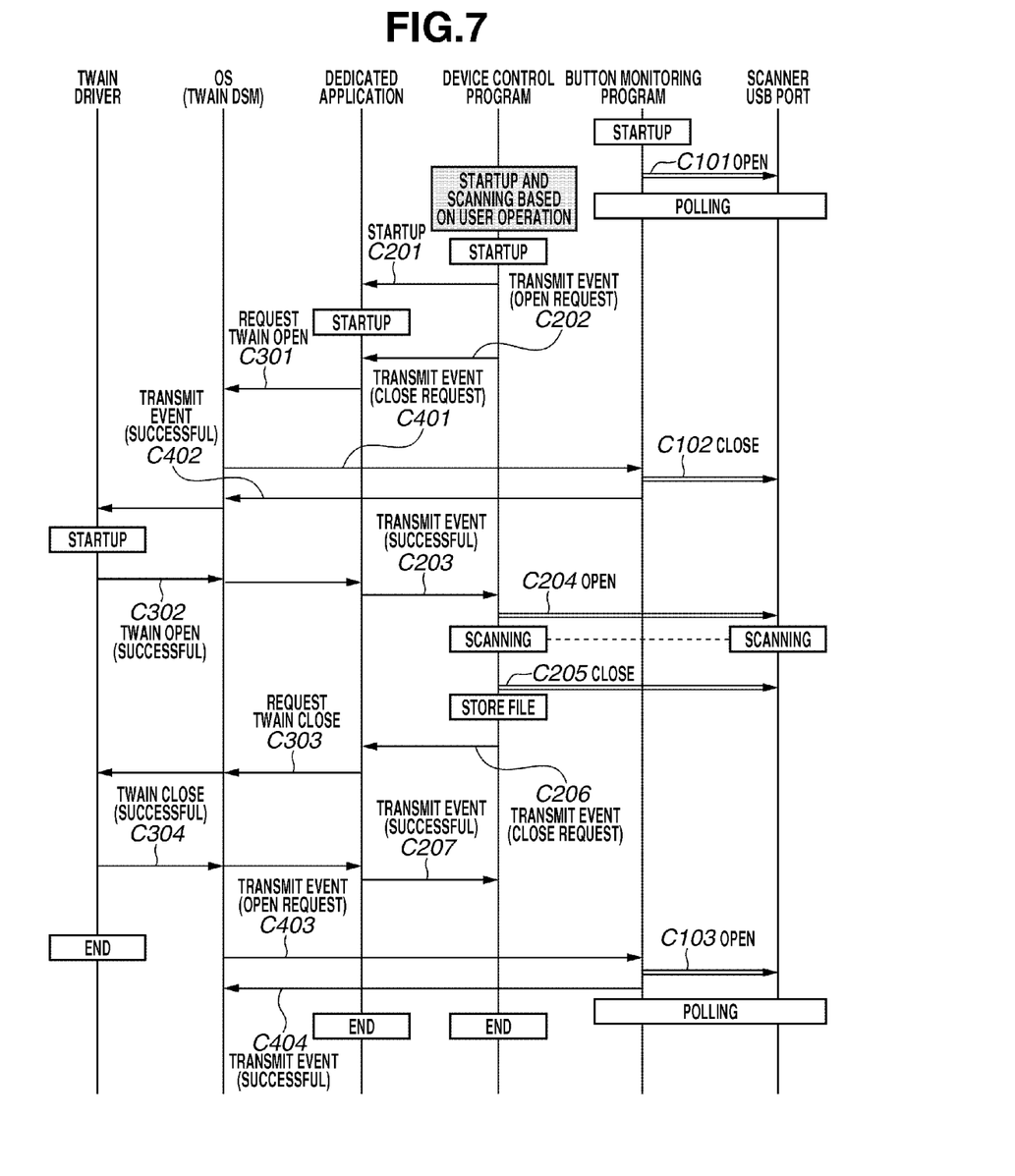
FIG. 7 illustrates a sequence of reading processing according to a second exemplary embodiment in which the device control program 70 is used.

Based on the processing illustrated in FIGS. 7 and 8, just by simply starting up and issuing a read instruction, the OS can be made to perform exclusive control even when a scanner driver that does not perform exclusive control of a communication channel is used to make the TWAIN DSM of the OS perform reading processing. The scanner driver can close the communication channel if the exclusive control of the OS is used, even if the scanner driver cannot identify the program using the communication channel. Above-described processing is the same as that according to the first exemplary embodiment illustrated in FIG. 4.

Further, in the second exemplary embodiment, when the TWAIN driver is started only to perform e exclusive control by the OS, the TWAIN driver does not open the USB port. Consequently, the processing for opening and closing the USB port by the TWAIN driver 50 can be omitted, whereby the processing load is reduced.

In addition, usually, when a USB port is opened by a TWAIN driver, initialization processing is executed to perform the reading processing that uses the scanner 10. Since this is not performed in the second exemplary embodiment, the reading processing performed by the device control program can be promptly started.

In the above described exemplary embodiments, although an example is described in which a USB is used as an interface with the scanner, some other interface may also be used, as long as it allows the OS to perform exclusive control of the communication channel among a plurality of programs. This can be either a local interface or a network interface.

Moreover, the scanner and the computer are not limited to those that are externally connected. A function corresponding to the scanner and a function corresponding to the computer in the above exemplary embodiments may be internally connected and integrated with each other.

Further, in the above described exemplary embodiments, although a program for causing the OS to perform the exclusive control of the communication channel by starting is based on the TWAIN standard, the same processing can be performed by starting a program based on the predetermined API other than the TWAIN standard.

Further, the peripheral apparatus is not limited to a scanner. For example, a printer may be used as the peripheral apparatus. In this case, exclusive control of communication channels may be performed when a printer driver performs print image data communication and when a program monitoring events in the printer performs event communication.

In other words, the exclusive control performed between a device driver which performs image data communication with a peripheral apparatus and another communication program which performs communication with the peripheral apparatus may use the exclusive control function of the OS as described above.

According to the above described exemplary embodiments, when a device driver is instructed to startup according to a procedure not based on a predetermined API, a communication channel can be closed utilizing exclusive control performed by the OS by starting another device driver that is based on a predetermined API.

Further, the present invention can also be realized by supplying software (a program) for realizing the functions of the above exemplary embodiments to a system or an apparatus via a network or via various storage media, and having a computer (or a central processing unit (CPU) or a micro processing unit (MPU)) of the system or apparatus read and execute the program. In this case, this program and the storage media on which the program is recorded constitute the present invention. In addition, the program may be executed by one computer, or by a plurality of computers linked together. Still further, the above described processing does not all have to be realized by software. A part or all of the processing can be realized by hardware.

The present invention is not limited to the above-described exemplary embodiments, and various modifications including application to other exemplary embodiments or combination with other exemplary embodiments based on the spirit of the present invention, are possible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus which operates on a predetermined OS (Operating System) and communicates with a peripheral device via a communication channel, the apparatus comprising:
    a requesting unit configured to issue, in response to a first request to startup a first program for communicating with the peripheral device via the communication channel, a second request to startup a second program for causing a function of the predetermined OS to close the communication channel to the predetermined OS;
    a connecting unit configured to establish, after the communication channel is closed by starting up the second program in accordance with the second request issued by the requesting unit, a connection by the first program using the communication channel; and
    at least one processor configured to perform a functionality of at least one of the requesting unit and the connecting unit.

2. The apparatus according to claim 1, further comprising a setting unit configured to issue a predetermined setting for closing the second program when the first program performs communicating with the peripheral device.

3. The apparatus according to claim 1, wherein the second program is started up in accordance with a predetermined API (Application Programming Interface), and the first program is not started up in accordance with the predetermined API.

4. The apparatus according to claim 3, wherein the predetermined API is a TWAIN (Tool Without An Interesting Name) and the function of the predetermined OS is a TWAIN DSM (Data Source Manager).

5. The apparatus according to claim 1, wherein the function of the predetermined OS closes the communication channel based on exclusive control by starting up the second program.

6. The apparatus according to claim 1, wherein the communication channel is a USB (Universal Serial Bus) port.

7. The apparatus according to claim 1, wherein the peripheral device is a scanner, and the first program includes a function of a scanner driver for receiving scanned image data from the scanner.

8. The apparatus according to claim 1, further comprising a discriminating unit configured to discriminate whether the first program is a predetermined program, and a determining unit configured to determine not to cause the second program to establish a connection using the communication channel in a case where the discriminating unit discriminates the first program is the predetermined program.

9. A method of controlling a system which operates on a predetermined OS (Operating System) and communicates with a peripheral device via a communication channel, the method comprising:
    issuing, in response to a first request to startup a first program for communicating with the peripheral device via the communication channel, a second request to startup a second program for causing a function of the predetermined OS to close the communication channel to the predetermined OS; and
    establishing, after the communication channel is closed by starting up the second program in accordance with the issued second request, a connection by the first program using the communication channel.

10. A non-transitory computer-readable storage medium storing a computer-executable program for performing a method of controlling a system which operates on a predetermined OS (Operating System) and communicates with a peripheral device via a communication channel, the method comprising:

issuing, in response to a first request to startup a first program for communicating with the peripheral device via the communication channel, a second request to startup a second program for causing a function of the predetermined OS to close the communication channel to the predetermined OS; and     establishing, after the communication channel is closed by starting up the second program in accordance with the issued second request, a connection by the first program using the communication channel.

11. The non-transitory computer-readable storage medium according to claim 10, wherein the method further comprises issuing a predetermined setting for closing the second program when the first program performs communicating with the peripheral device.

12. The non-transitory computer-readable storage medium according to claim 10, wherein the second program is started up in accordance with a predetermined API (Application Programming Interface), and the first program is not started up in accordance with the predetermined API.

13. The non-transitory computer-readable storage medium according to claim 10, wherein the predetermined API is a TWAIN (Tool Without An Interesting Name) and the function of the predetermined OS is a TWAIN DSM (Data Source Manager).

14. The non-transitory computer-readable storage medium according to claim 10, wherein the function of the predetermined OS closes the communication channel based on exclusive control by starting up the second program.

15. The non-transitory computer-readable storage medium according to claim 10, wherein the communication channel is a USB (Universal Serial Bus) port.

16. The non-transitory computer-readable storage medium according to claim 10, wherein the peripheral device is a scanner, and the first program includes a function of a scanner driver for receiving scanned image data from the scanner.

17. The non-transitory computer-readable storage medium according to claim 10, the method further comprises discriminating whether the first program is a predetermined program, and determining not to cause the second program to establish a connection using the communication channel in a case where it is discriminated the first program is the predetermined program.

* * * * *